Nov. 7, 1961     P. S. MUNN     3,007,252

ELECTRIC CALIPER

Filed June 10, 1959

Paul S. Munn
*INVENTOR.*

BY
*Adams, Forward and McLean*
ATTORNEYS

United States Patent Office 3,007,252
Patented Nov. 7, 1961

3,007,252
ELECTRIC CALIPER
Paul S. Munn, Melrose, Mass., assignor to Simplex Wire and Cable Company, Cambridge, Mass., a corporation of Massachusetts
Filed June 10, 1959, Ser. No. 819,471
7 Claims. (Cl. 33—178)

My invention relates to measuring and testing and in particular provides an electric caliper suitable for measuring such dimensions as thickness and diameter.

It is a principal object of my invention to provide such an electric caliper which is so constructed that internal and external transverse dimensions of long articles can be gaged throughout the length of the article by drawing the article past the caliper.

In a more specific sense it is an object of my invention to provide a diameter gage of simple construction for measuring the external diameters of insulated wire and cable as these are drawn from an extruder or other continuously operating manufacturing apparatus. It is a further object of my invention to provide such a diameter gage which can be readily adjusted to accommodate different sizes of cable and which will require a minimum space in the cable manufacturing line, thus making feasible its installation in existing cable manufacturing lines.

It is a still further object of my invention to provide such a diameter gage which will exert a minimum of contact force upon the cable being measured so as to avoid compression or damage to resilient or soft cable elements. A further object of my invention is to provide such a diameter gage which has very low inertia, so that diameter fluctuations in rapidly moving cable can be accurately measured.

It is still another object of my invention to provide such a diameter gage which can measure diameters in more than one plane to give average diameter or to measure ovalness.

In still another aspect of my invention, I provide a gage suitable for measuring wall thickness of insulated coverings and the like.

It is yet a further object of my invention to provide such a gage for measuring transverse dimensions of moving articles in which lateral motion of the article as it is drawn past the gage will not affect the operation of the gage. In another aspect it is also an object of my invention to provide such a gage in which variations in ambient temperature will not affect the operation of the gage.

These and other objects of my invention which will become more apparent hereinafter are essentially obtained by employing a pair of cantilever mounted, spring-like caliper legs which are positioned with their free ends adjacent each other to permit an article to be gaged to be passed between or about the free ends such that changes in the dimensions of the article will cause flexure of the caliper legs. The flexure of the caliper legs is utilized to impose strain on strain-sensitive electrical impedance devices which are bonded to each leg. In the simple case a pair of such strain-sensitive devices are employed, one being bonded on the inner side of one leg, i.e., facing the article being gaged, and the other being bonded on the outer side of the other leg, i.e., facing away from the article being gaged. Flexing movement of the two caliper legs caused by changes in dimensions of an article passed between them will thus cause one strain-sensitive device on one leg to be strained in a manner opposing the strain imposed by such flexing on the other strain-sensitive device associated with the other caliper leg. It will be also evident that equal flexure of the legs in the same direction caused by lateral motion of the article being gaged will strain each of the strain-sensitive devices in an identical manner.

Thus, it is evident that the changes in the impedances of the strain-sensitive devices can be measured in a suitable electrical measuring circuit, such as a Wheatstone bridge, in a manner that equal changes of impedances of the strain-sensitive devices will not be detected and yet different changes in the impedances of the strain-sensitive devices will be detected as a measure of the changes in transverse dimension of the article being gaged. Thus, if the measuring circuit employed is a Wheatstone bridge, the two strain-sensitive devices should be connected electrically in adjacent arms of the bridge.

Changes in the impedances of the strain-sensitive devices caused by changes in the ambient temperature would normally be equal since the devices are closely associated. However, in some circumstances one caliper leg can be heated to a different temperature than the other. This can occur, for example, when the article being gaged is heated and the caliper legs are mounted in vertical relation to each other. Thus, convection air currents set up by the heated article would tend to cool the lower caliper leg and heat the upper caliper leg, unequally changing the impedances of the strain-sensitive devices. It is also desirable, in certain circumstances, to secure a greater electrical output than can be obtained with the simple gage.

It is, accordingly, contemplated that the caliper of my invention will preferably include a second pair of strain-sensitive devices, one bonded to each caliper leg, on the opposite sides of the strain-sensitive device of the first pair bonded to such leg. In this arrangement, I therefore provide a pair of caliper legs each having a pair of strain-sensitive devices bonded to it in back-to-back relation with one strain-sensitive device on the inner side of each leg and another strain-sensitive device on the outer side of each leg. It will be evident that the preferred form of my invention thus includes essentially two gages of the basic form mounted, however, on common caliper legs and connected to a common measuring circuit.

In this aspect of my invention, the measuring circuit for measuring the changes in impedances of the four strain-sensitive devices functions in a manner such that the changes in the impedances of the pair of strain-sensitive devices associated with each leg oppose the changes in the impedances of the correspondingly disposed pair of strain-sensitive devices on the other leg. Thus the measuring circuit will still fail to detect any such impedance changes when the free ends of both legs are moved in the same direction the same amount but will detect the impedance changes when movement of the legs produces a relative change in the separation of their free ends. Moreover, when the impedances of a pair of strain-sensitive devices associated with one leg change equally, for example, by change in temperature, this change will not be detected. Typically, the measuring circuit would be a Wheatstone bridge in which the pair of strain-sensitive devices associated with each leg of the caliper are connected in adjacent arms of the bridge and in which the strain-sensitive devices on the inner sides of the caliper legs facing the article being gaged and each other are connected in opposite arms of the bridge. Thus, the strain-sensitive devices on the outer sides of the caliper legs facing away from the article being gaged and each other are similarly connected in opposite arms of the bridge. It will also be observed that the bridge circuit thus retains the original connection when only a pair of strain-sensitive devices are used in the simple gage generally described above, with the impedance of the inner gage on each leg connected in an arm of the bridge adjacent that arm of the bridge in which the impedance of the strain-sensitive gage on the outer side of the opposite leg of the caliper is connected. It will be further observed that the bridge unbalance produced by the preferred form of my invention is twice that produced by the simple form.

By strain-sensitive electrical impedance device it will be understood I refer to devices such as bonded resistance wire strain gages which include electrical elements having measurable impedance, such as resistance, which will vary as a function of the strain imposed upon the strain-sensitive device.

For a more complete understanding of the practical application of the principles of my invention, reference is made to the appended drawings in which.

Figure 1:
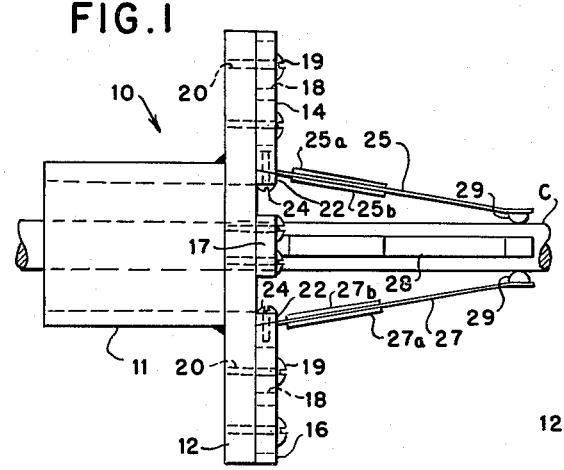
FIGURE 1 is an elevational view of a diameter gage constructed in accordance with my invention.
Figure 2:
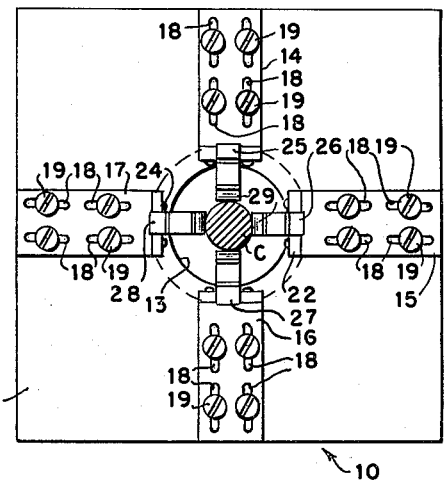
FIGURE 2 is an end view of the gage shown in FIGURE 1.

Referring more particularly to FIGURES 1 and 2, the reference numeral 10 generally designates an electrical caliper constructed in accordance with my invention. Caliper 10 includes a hollow sleeve-like mounting fitting 11 which is ordinarily affixed to an abutment or the like positioned adjacent the path of travel of an insulated cable C or similar article to be gaged at a convenient point in the manufacturing assembly line for such cable. Sleeve 11 is arranged specifically such that cable C passes centrally through sleeve 11.

At one end, preferably the exit end of sleeve 11 relative to the movement of cable C a plate 12 is affixed to sleeve 11 by welding or similar arrangement. Plate 12 is provided with a central aperture 13 which registers with the interior bore of hollow sleeve 11 such that cable C will pass through central bore 13 with the faces of plate 12 lying in planes transverse to the direction of movement of cable C.

On its end face remote from sleeve 11 plate 12 is provided with four mounting blocks 14, 15, 16 and 17 arranged at 90° intervals about opening 13 through plate 12. Each block 14, 15, 16, 17 is elongated in a generally radial direction with respect to the center of opening 13 and is provided with a series of slots 18 which extend lengthwise of each block 14, 15, 16 and 17. Each of the slots 18 is sized to receive the shank of a set screw 19 threadedly engaging a suitable tapped bore 20 in plate 12. It will be apparent that by loosening set screws 19 each block 14, 15, 16, 17 can be moved radially with respect to the center of opening 13 a short distance by reason of the elongated shape of its slots 18 to adjust the position of the blocks 14, 15, 16, 17 within the limits of movement of the associated slots 18 relative to the shanks of set screws 19, whereupon set screws 19 can be tightened to affix the associated block in position.

Figure 4:
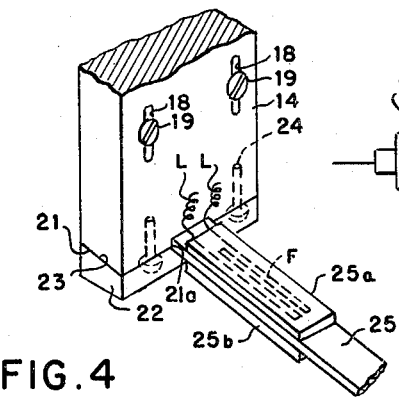
FIGURE 4 is a fragmentary isometric view of a portion of the device shown in FIGURES 1–3.

Referring also to FIGURE 4 which shows block 14 in fragmentary view as typifying blocks 14, 15, 16 and 17, the inner end of each block adjacent opening 13 is provided with a tapered face 21 making an angle of about 10° with the horizontal in the case of faces 21 of blocks 14 and 16 which extend vertically on plate 12 and making a similar angle with the vertical in the case of blocks 15 and 17 which extend horizontally on plate 12. Such tapered faces 21, moreover, are inclined inwardly toward the center of opening 13 and axis of cable C to be gaged toward a point on such axis remote from sleeve 11 (right in FIGURE 1). Each tapered face 21 of blocks 14, 15, 16, 17 is further provided with a clamping block 22 which has a face 23 confronting tapered face 21 and which is secured to its associated block 14, 15, 16, 17 by means of screws 24, by means of which clamping block 22 can be brought tightly against each tapered face 21. Tapered faces 21 of blocks 14, 15, 16, 17 are also each provided with a flat bottomed, shallow recess or notch 21a extending across face 21 between the pair of screws 24 associated with the mounting block.

Four flat springs 25, 26, 27, 28 made of flexible, resilient material such as spring steel are clamped at one end of each between blocks 22 and their associated blocks 14, 15, 16, 17, respectively, by positioning an end of each such spring in recess 21a between confronting faces 21 and 23 and tightening screws 24 in such a manner that the free ends of springs 25, 26, 27 and 28 lie adjacent each other extending toward the right in FIGURE 1. The free ends of springs 25, 26, 27, 28 are each provided on their confronting faces with a semi-cylindrical contact 29 of tungsten carbide or similar bearing material. It will be thus apparent that the opening between contacts 29 on springs 25, 26, 27, 28 has a substantially smaller diameter than opening 13 through plate 12, such that cable C while freely passing through opening 13 will contact each of contacts 29 producing flexure of springs 25, 26, 27, 28. From the preceding description it will also be apparent that springs 25 and 27 are mounted diametrically opposed about cable C to be gaged in a vertical plane and similarly, springs 26 and 28 are diametrically opposed relative to cable C in a horizontal plane.

Each spring 25, 26, 27, 28 carries a pair of back-to-back mounted strain gages 25a and 25b, 26a and 26b, 27a and 27b, and 28a and 28b, respectively. It will be apparent from the preceding description that springs 25, 26, 27, 28 being flat and being secured at one set of adjacent ends between a pair of clamped confronting surfaces are positioned with their flat sides facing outwardly from and inwardly toward the axial center, along which a cable C is to be passed and from which mounting blocks 14, 15, 16, 17 extend radially. Thus, each spring may be said to have an inner flat side facing toward such axis and an outer flat side facing away from such axis. In order to clearly identify the location of strain gages 25a, 25b, etc., the suffix "a" has been used to denote the strain gages mounted on the outer such flat side of each spring, while the suffix "b" has been employed to denote the strain gages located on the inner flat faces of such springs. Each of strain gages 25a, 25b, 26a, etc. is the type known in the art as bonded resistance wire strain gages and which are described in United States Patent 2,292,549. The back-to-back mounting on a cantilever mounted spring is, moreover, described more fully in United States Patent 2,442,938.

Typically, referring to FIGURE 4, each strain gage, such as strain gage 25a, will include a resistance wire filament F extending lengthwise of the spring to which it is bonded and which may include more than one pass in a lengthwise direction. Filament F is provided with leads L, L for connecting filament F in an external measuring circuit. Filament F will, moreover, be mounted on and bonded throughout its length to its associated spring element, such as spring element 25, although electrically insulated from the spring element, such that flexure of spring element 25 in a plane perpendicular to the planes of the flat faces of spring 25 to which strain gages 25a and 25b are bonded will cause one filament F, for example, associated with strain gage 25a, to be stretched and the other filament F, for example, associated with the other strain gage 25b to be contracted. Filaments F are, moreover, constructed of a material which has a measurable electrical impedance, in the illustrated case, resistance, which will vary as a function of such stretching and contraction, such that the resistance of the filament F associated with strain gage 25a and the resistance of the filament F associated with strain gage 25b will vary inversely as spring 25 is flexed in a plane perpendicular to its flat faces such as it would be flexed in the arrangement shown in FIGURES 1 and 2 by a change in the diameter of the cable C being gaged. Typically, strain gages 25a, 25b, etc. are bonded to their associated springs 25, 26, 27, 28 by a thermosetting phenolic resin cement.

Figure 3:
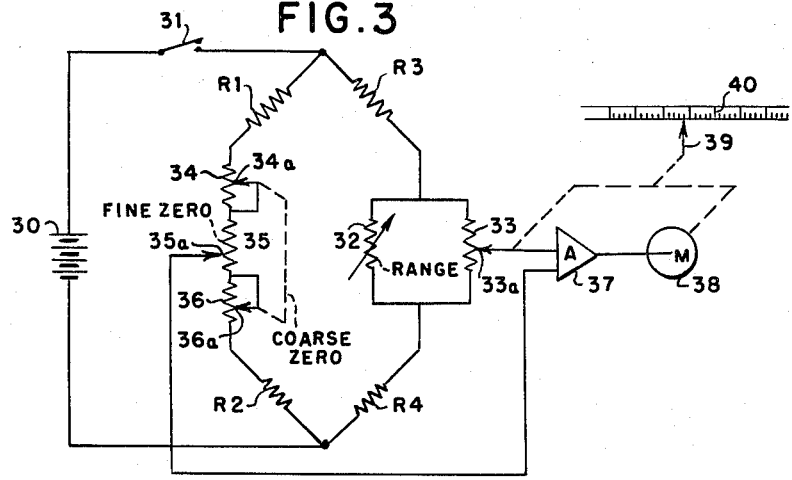
FIGURE 3 is a schematic wiring diagram of a typical measuring circuit for use in connection with the gage shown in FIGURE 1.

FIGURE 3 shows a typical wiring arrangement which is suitable for measuring diameter, ovalness and the like of a cable C passed through sleeve 11 and opening 13 between carbide contact tips 29 of springs 25, 26, 27, 28.

In FIGURE 3 a Wheatstone bridge measuring circuit is employed to operate a null recording servo-amplifier which serves as an indicating device of the dimension gaged by electric caliper 10. In FIGURE 3 the Wheatstone bridge includes four arms made up of resistors $R_1$, $R_2$, $R_3$ and $R_4$, with resistors $R_1$ and $R_4$ connected in opposite arms of the bridge and resistors $R_2$ and $R_3$ connected in the other pair of opposite arms of the bridge with resistors $R_1$ and $R_3$ having a common junction and resistors $R_2$ and $R_4$ having a common junction. The Wheatstone bridge measuring circuit in the illustrated case is completed by a D.C. bias source 30 connected through a switch 31 across the common junction of resistors $R_1$ and $R_3$ and the common junction of resistors $R_2$ and $R_4$. In addition, resistors $R_3$ and $R_4$ are connected together through a parallel combination of a variable resistor 32 and a slide wire potentiometer 33. Also, resistors $R_1$ and $R_2$ are connected together through a series combination of three potentiometers 34, 35 and 36. Potentiometers 34 and 36 have their wiper contacts 34a and 36a connected to the common junctions of potentiometers 34 and 35 and of potentiometers 35 and 36, respectively, and mechanically ganged such that when potentiometer wiper contact 34a is in a position shorting potentiometer 34, the wiper contact 36a is in a position including the total resistance of potentiometer 36 in the bridge circuit.

The electrical circuit is completed by a null recording servo-amplifier, such as a Brown recorder, which includes an amplifier 37 having its input connected to wiper contact 35a of potentiometer 35 and to wiper contact 33a of slide wire 33. The output of amplifier 37 is fed to a motor 38 which is driven thereby in response to the presence of a potential across the input of amplifier 37 and which is mechanically coupled to drive wiper contact 33a on slide wire 33, such that the presence of a potential across the input of amplifier 37 causes motor 38 to drive wiper contact 33a in a direction reducing that potential to zero. The null recording servo-amplifier in addition includes a pointer arm 39 mechanically coupled to motor 38 and wiper contact 33a which indicates on a scale 40 the relative position of wiper contact 33a along slide wire 33.

It will be apparent to those familiar with null recording servo-amplifiers of this type that the bridge is initially balanced manually, first by adjusting wiper contacts 34a and 36a for a coarse zero setting of pointer 39 of scale 40. Thereafter, a fine zero position is set by manually adjusting wiper contact 35a. Variable resistor 32 is, of course, previously adjusted to set the range of the instrument.

In employing the circuit shown in FIGURE 3 for indicating the dimensions gaged by electric caliper 10 in the simple case, resistors $R_1$ and $R_2$ are the filaments F, F of strain gages 25a and 27b, while resistors $R_3$ and $R_4$ are fixed resistors. Thus, as cable C is drawn through electric caliper 10 as described above, any change in its vertical transverse dimension will flex caliper legs 25 and 27 imposing unequal strains upon strain gages 25a and 27b, upsetting the balance of the bridge circuit in FIGURE 3 and thereby causing an output voltage to appear at the input circuit of amplifier 37. The resultant output of amplifier 37 will drive motor 38 to move wiper contact 33a to a position on slide wire 33 restoring the balance on the Wheatstone bridge and at the same time move pointer 39 to a new position on scale 40 indicating the change in vertical dimension of cable C. A similar circuit will, of course, be employed in identical manner for measuring changes in horizontal transverse dimensions of cable C including the resistances of filaments F, F of strain gages 26a and 28b.

It will also be evident that changes imposed upon strain gages 25a and 27b or 26a and 28b caused by lateral motion of cable C as it is drawn through electric caliper 10 or by changes in ambient temperature will produce equal strains on the strain gages 25a and 27b, for example, and hence, will not upset the balance of the bridge circuit shown in FIGURE 3.

As indicated above, however, the preferred arrangement of the measuring circuit will include the filaments F, F, F, F of the four strain gages mounted on a pair of opposing cantilever mounted springs, such as springs 25 and 27, thus in effect providing a double form of the simple gage and providing temperature compensation when the temperature of the strain gages associated with one spring may be different from those associated with another spring. To accomplish this, resistors $R_1$ and $R_2$ remain the filaments F, F of strain gages 25a and 27b. However, resistors $R_3$ and $R_4$ are the filaments F, F of strain gages 25b and 27a, respectively.

In this arrangement it will be apparent that a change in vertical diameter of cable C, which would cause opposing changes in the resistances of filaments F, F of strain gages 25a and 25b (resistors $R_1$ and $R_2$), would also produce the same opposing changes in the filaments F, F of strain gages 27a and 25b (resistors $R_4$ and $R_3$). Thus, using identical strain gages the resistances of resistors $R_1$ and $R_4$ would change identically and the resistances of resistors $R_2$ and $R_3$ would change identically but in the opposite manner of the changes in the first pair. Consequently, the balance of the bridge will be upset in precisely the same manner as in the previously described arrangement (where resistors $R_1$ and $R_2$ were the filaments F, F of strain gages 25a and 27b and where resistors $R_3$ and $R_4$ were fixed) except that the upset in balance would be of double magnitude. Again, changes in the resistances of filaments F, F, F, F of strain gages 25a, 27b, 27a, 25b produced by lateral motion of cable C would be equal for resistors $R_1$ and $R_2$ connected in one pair of adjacent arms of the bridge and would be equal for resistors $R_3$ and $R_4$ connected in the other pair of adjacent arms. Accordingly, such changes would not produce an upset in the balance of the bridge circuit since $R_1/R_3$ will remain equal to $R_2/R_4$. Similarly, if strain gages 25a and 25b are heated to a different temperature than strain gages 27a and 27b, the pair of resistors $R_1$ and $R_3$ in one pair of adjacent arms of the bridge would be affected equally and the remaining pair of resistors $R_2$ and $R_4$ in the opposite pair of adjacent arms of the bridge would also be affected equally. Accordingly, bridge balance would not be upset.

As described above in illustration of the simple case, the circuit of FIGURE 3 would be similarly duplicated in the preferred arrangement for measuring horizontal diameter and would include the four filaments F, F, F, F of strain gages 26a, 28b, 28a, 26b as resistors $R_1$, $R_2$, $R_4$, $R_3$.

Thus as cable C is drawn through caliper 10 the position of pointer 39 on scale 40 for the circuit associated with the strain gages mounted on springs 25 and 27 will indicate the diameter of cable C in a vertical plane, while the position of the pointer 39 on scale 40 associated with strain gages on springs 26 and 28 will indicate the diameter of cable C in a horizontal plane.

In a typical instrument caliper 10 will include strain gages 25a, 25b, 26a, 26b, etc., which are identically mounted on identically sized and angled springs 25, 26, 27 and 28. For gaging ¼-inch to approximately 1-inch diameter cables over a ±0.025-inch to 0.050-inch range, plate 12 is a 5½-inch square piece of ⅜-inch steel plate having a center opening 13 of 1½-inches diameter.

Blocks 14, 15, 16 and 17 are adjusted to space the clamped ends of springs 25, 26, 27, 28 radially centered about opening 13 at distances of 1¾-inches. Each spring 25, 26, 27, 28 has an active length of 3 inches, is ¼-inch wide and is 0.020-inch thick. Strain gages 25a, 25b, 26a, 26b are SR-4 Bakelite strain gages, type AB-7 and are bonded to their associated springs with a thermosetting Bakelite cement. The unstrained resistance of the filament F of each strain gage 25a, 25b, 26a, 26b, etc. is 120 ohms. Potentiometers 34 and 36 are each 3 ohms, while potentiometer 35 is 0.1 ohm and range potentiometer 32 is 0.1 ohm. Slide wire 33 is actually part of the Brown recorder employed as the null recording servo-amplifier and has a very large resistance compared with that of range variable resistor 32.

Preliminarily, the electrical circuits of caliper 10 are energized and allowed to warm up for a period of 40 minutes. Thereafter a machined steel rod having a 1.050-inch diameter step and a 1.070-inch diameter step is employed to calibrate the measuring circuits where a cable diameter of 1.050 inches is desired. Thus, the 1.050-inch diameter step of the rod is inserted centrally between contacts 29. The mounting blocks 14, 15, 16, 17 are moved radially outward until contacts 29 no longer engage the 1.050-inch step. The mounting blocks 14, 15, 16, 17 are then moved radially inward until the contacts 29 just engage the 1.050-inch step. The blocks 14, 15, 16, 17 are then further moved radially inward a distance slightly greater than the largest lateral cable vibrationary excursion expected. The measuring circuits associated with the horizontal and vertical caliper springs 26 and 28, and 25 and 27, respectively, are adjusted to read zero on scale 40 of each. Then employing the 1.070-inch diameter step the circuits are adjusted to indicate 20 mils on each scale 40. The gage is employed simply by passing a cable C through sleeve 11, opening 13 and between contacts 29. As the cable is drawn between contacts 29, variations in this diameter departing from 1.050 inches are indicated by pointers 39 on scales 40.

Instead of measuring diameters in two planes, caliper 10 can be designed to measure average diameters and ovalness. In the case of measuring average diameter, the basic circuit of FIGURE 3 is connected to include a pair of filaments F, F constituting a simple gage for measuring vertical diameter, for example, filaments F, F of strain gages 25a and 27b, together with a similarly arranged pair of filaments F, F of a pair of strain gages constituting a simple gage for measuring horizontal changes in diameter, for example, the filaments F, F of strain gages 28a and 26b. More particularly, filaments F, F of strain gages 25a and 27b will remain in the bridge circuit of FIGURE 3 as resistors $R_1$ and $R_2$, but filaments F, F of strain gages 28a and 26b are connected in the bridge measuring circuit as resistors $R_4$ and $R_3$, respectively. With this connection the measuring circuit shown in FIGURE 3 will indicate the average of vertical and horizontal diameters of cable C as it is drawn through caliper 10.

The remaining strain gages which are not connected in the average diameter measuring arrangement can be connected in separate circuits, such as shown in FIGURE 3, for measuring vertical and horizontal diameters separately, if desired, or they can be connected to measure ovalness in a circuit such as that shown in FIGURE 3. In the ovalness circuit resistors $R_1$ and $R_2$ are the filaments F, F of a pair of strain gages forming a simple gage for measuring vertical diameter; for example, respectively filaments F, F of strain gages 27a and 25b. The remaining resistors $R_3$ and $R_4$ are the filaments F, F of strain gages 26a and 28b forming another simple gage for measuring horizontal diameter. Thus connected, the measuring circuit shown in FIGURE 3 will indicate the difference between vertical and horizontal diameters, or in other words, ovalness.

It will be apparent that the before-mentioned advantage of the basic measuring circuit with respect to insensitivity to cable vibration will be retained.

Figure 5:
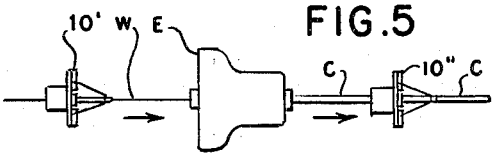
FIGURE 5 is a somewhat diagrammatic elevational view illustrating a particular application of the diameter gage.

Referring more particularly to FIGURE 5, it is also possible by employing a pair of calipers 10 to measure wall thickness. This is accomplished by positioning one caliper 10' to gage the wire W entering the head of an extruder E (for extruding insulating material over wire W to make cable C) and by positioning the other caliper 10" to gage the diameter of the insulated cable C. While thus positioned, the calipers 10', 10" would each read respectively, the diameter of the wire and the insulated cable, permitting wall thickness measurements to be taken as half the difference. A single measuring circuit can be constructed to gage the difference and hence, wall thickness directly by substituting for resistors $R_1$, $R_2$, $R_3$, $R_4$ the filaments F, F of strain gages 25a and 27b of caliper 10' measuring wire diameter and the filaments F, F of strain gages 25a and 27b of the caliper 10" measuring insulated cable diameter. This arrangement will measure wall thickness in a vertical plane directly. Obviously, an identical arrangement employing strain gages associated with the caliper legs lying in the horizontal plane can be similarly constructed to measure wall thickness in the horizontal plane.

I claim:

1. An electric caliper which includes a first flexible, resilient caliper leg including a first flat spring member, a first strain-responsive electrical impedance device, said first device being mounted on a flat side of said first spring member and bonded thereto; a second flexible, resilient caliper leg including a second flat spring member, a second strain-responsive electrical impedance device, said second device being mounted on a flat side of said second spring member and bonded thereto; said legs being positioned with one end of said first spring member adjacent one end of said second spring member, means fixedly securing the other ends of said first and said second spring members with the flat side of said first member having said first device bonded thereto facing the flat side of said second member opposite that side on which said second device is bonded; and an electrical impedance measuring circuit including said first and second impedance devices and having an output responsive to the changes in the impedances of said devices whereby changes in the impedances of such devices caused by flexure of said spring members without relative movement between said one end of said first member and said one end of said second member will leave said output unchanged and whereby flexure of said spring members with relative movement between said one end of said first member and said one end of said second member will produce a change in said output responsive to said relative movement.

2. An electric caliper according to claim 1 in which said measuring circuit includes a bridge circuit in which said first and second devices are connected in adjacent arms thereof.

3. An electric caliper which includes a first flexible, resilient caliper leg including a first flat spring member, a first strain-responsive electrical impedance device, and a second strain-responsive electrical impedance device, said first and said second devices being mounted on opposite flat sides of said first spring member and bonded thereto; a second flexible, resilient caliper leg including a second flat spring member, a third strain-responsive electrical impedance device and a fourth strain-responsive electrical impedance device, said third and fourth devices being mounted on opposite flat sides of said second spring member and bonded thereto; said legs being positioned with one end of said first spring member adjacent one end of said second spring member, means fixedly securing the other ends of said first and said second spring members with the flat side of said first member having said second device bonded thereto facing the flat side of said second member having said third device bonded thereto; and an electrical impedance measuring circuit including said first, second, third and fourth impedance devices and having an output responsive to the changes in the impedances of said devices whereby changes in the impedances of such devices caused by flexure of said spring members without relative movement between said one end of said first member and said one end of said second member will leave said output unchanged and whereby flexure of said spring members with relative movement between said one end of said first member and said one end of said second member will produce a change in said output responsive to said relative movement.

4. An electric caliper according to claim 3 in which said measuring circuit includes a bridge circuit in which said first and second devices are connected in one pair of adjacent arms and in which said third and fourth devices are connected in the opposite pair of adjacent arms with said first and fourth devices connected in opposite arms and said second and third devices connected in opposite arms.

5. An electric caliper according to claim 3 in which said means securing said spring members includes a common mounting member for said first and second spring members on which said fixedly secured end of said first member and said fixedly secured end of said second member are mounted whereby said first and second members are positioned centered on a common plane with said fixedly secured ends spaced apart.

6. An electric caliper which includes a first flexible, resilient caliper leg including a first flat spring member and a first strain-responsive electrical impedance device mounted on one flat side of said first spring member and bonded thereto; a second flexible, resilient caliper leg including a second flap spring member and a second strain-responsive electrical impedance device mounted on one flat side of said second spring member and bonded thereto; a third flexible, resilient caliper leg including a third flat spring member and a third strain-responsive electrical impedance device mounted on one flat side of said third spring member and bonded thereto; a fourth flexible, resilient caliper leg including a fourth flat spring member and a fourth strain-responsive electrical impedance device mounted on one flat side of said fourth spring member and bonded thereto; means fixedly securing one end of each of said legs with said legs positioned at intervals about a space lying therebetween with the other flat side of said first member and said one flat side of said second member confronting each other and facing said central space, with said one flat side of said third member and the other flat side of said fourth member facing each other and said central space and with the other end of each said leg positioned adjacent the other ends of each of the remaining said legs to define an opening therebetween through which an article to be gaged can be passed in contact with each of said other ends; and an electrical impedance measuring circuit including said first, second, third and fourth impedance devices serially connected in a bridge circuit in which said first and second devices are connected in one pair of adjacent arms and in which said third and fourth devices are connected in the opposite pair of adjacent arms with said first and fourth devices connected in opposite arms and said second and third devices connected in opposite arms.

7. An electric caliper which includes a first flexible, resilient caliper leg including a first flat spring member and a first strain-responsive electrical impedance device mounted on one flat side of said first spring member and bonded thereto; a second flexible, resilient caliper leg including a second flat spring member and a second strain-responsive electrical impedance device mounted on one flat side of said second spring member and bonded thereto; a third flexible, resilient caliper leg including a third flat spring member and a third strain-responsive electrical impedance device mounted on one flat side of said third spring member and bonded thereto; a fourth flexible, resilient caliper leg including a fourth flat spring member and a fourth strain-responsive electrical impedance device mounted on one flat side of said fourth spring member and bonded thereto; means fixedly securing one end of each of said legs with said legs positioned at intervals about a space lying therebetween with said one flat side of said first member and the other flat side of said second member confronting each other and facing said central space, with the other flat side of said third member and said one flat side of said fourth member facing each other and said central space and with the other end of each said leg positioned adjacent the other ends of each of the remaining said legs to define an opening therebetween through which an article to be gaged can be passed in contact with each of said other ends; and an electrical impedance measuring circuit including said first, second, third and fourth impedance devices serially connected in a bridge circuit in which said first and second devices are connected in one pair of adjacent arms and in which said fourth and third devices are connected in the opposite pair of adjacent arms with said first and third devices connected in opposite arms and said second and fourth devices connected in opposite arms.

References Cited in the file of this patent

UNITED STATES PATENTS

| | | |
|---|---|---|
| 2,344,642 | Ruge | Mar. 21, 1944 |
| 2,514,847 | Coroniti et al. | July 11, 1950 |
| 2,670,543 | Eppler | Mar. 2, 1954 |